United States Patent
Larcher et al.

(10) Patent No.: US 10,350,578 B2
(45) Date of Patent: Jul. 16, 2019

(54) COMPOSITION CONTAINING ZIRCONIUM, CERIUM AND YTTRIUM OXIDES HAVING A HIGH REDUCIBILITY, METHOD FOR PREPARING SAME AND USE THEREOF IN CATALYSIS

(71) Applicant: RHODIA OPERATIONS, Paris (FR)

(72) Inventors: Olivier Larcher, Perigny (FR); Emmanuel Rohart, Lyons (FR); Simon Ifrah, Lagord (FR)

(73) Assignee: RHODIA OPERATIONS, Aubervilliers (FR)

( * ) Notice: Subject to any disclaimer, the term of this patent is extended or adjusted under 35 U.S.C. 154(b) by 464 days.

(21) Appl. No.: 14/550,358

(22) Filed: Nov. 21, 2014

(65) Prior Publication Data

US 2015/0202596 A1 Jul. 23, 2015

Related U.S. Application Data

(63) Continuation of application No. 12/989,185, filed as application No. PCT/EP2009/054715 on Apr. 21, 2009, now abandoned.

(30) Foreign Application Priority Data

Apr. 23, 2008 (FR) ...................... 08 02272

(51) Int. Cl.
| | |
|---|---|
| *B01J 23/10* | (2006.01) |
| *B01D 53/94* | (2006.01) |
| *B01J 23/00* | (2006.01) |
| *B01J 37/03* | (2006.01) |
| *C01F 17/00* | (2006.01) |
| *C01G 25/00* | (2006.01) |
| *C01G 25/02* | (2006.01) |
| *B01J 35/02* | (2006.01) |
| *B01J 37/06* | (2006.01) |
| *B01J 37/08* | (2006.01) |
| *F01N 3/10* | (2006.01) |

(52) U.S. Cl.
CPC ............. *B01J 23/10* (2013.01); *B01D 53/94* (2013.01); *B01D 53/945* (2013.01); *B01J 23/002* (2013.01); *B01J 35/026* (2013.01); *B01J 37/03* (2013.01); *B01J 37/031* (2013.01); *B01J 37/06* (2013.01); *B01J 37/08* (2013.01); *C01F 17/0018* (2013.01); *C01G 25/006* (2013.01); *C01G 25/02* (2013.01); *B01D 2255/206* (2013.01); *B01D 2255/407* (2013.01); *B01D 2255/9207* (2013.01); *B01J 2523/00* (2013.01); *C01P 2002/52* (2013.01); *C01P 2006/12* (2013.01); *C01P 2006/13* (2013.01); *F01N 3/10* (2013.01); *Y02A 50/2324* (2018.01); *Y02T 10/22* (2013.01)

(58) Field of Classification Search
CPC ......... B01J 21/066; B01J 23/10; B01D 53/94; B01D 53/945; B01D 2255/206; B01D 2255/407; B01D 2255/9207; C01F 17/0018; C01G 25/006; C01G 25/02; Y02A 50/2324; C01P 2002/52; C01P 2006/12; C01P 2006/13; F01N 3/10
USPC ............... 502/302–304, 349, 355; 423/213.2
See application file for complete search history.

(56) References Cited

U.S. PATENT DOCUMENTS

| | | | | |
|---|---|---|---|---|
| 5,075,276 A | * | 12/1991 | Ozawa ................. | B01D 53/945 423/213.5 |
| 6,133,194 A | * | 10/2000 | Cuif ..................... | B01D 53/945 502/162 |
| 7,964,527 B2 | * | 6/2011 | Larcher ................ | B01D 53/945 423/213.2 |
| 8,956,994 B2 | * | 2/2015 | Ifrah ................... | B01D 53/9413 502/100 |
| 2008/0090723 A1 | * | 4/2008 | Okamoto ............. | B01D 53/945 502/304 |
| 2009/0274599 A1 | | 11/2009 | Larcher et al. | |

FOREIGN PATENT DOCUMENTS

| | | |
|---|---|---|
| EP | 1870378 A1 | 12/2007 |
| JP | 2000176282 A | 6/2000 |
| WO | 2007093593 A1 | 8/2007 |

OTHER PUBLICATIONS

Vidmar et al., "Effects of Trivalent Dopants on the Redox Properties of Ce0.6Zr0.4O2Mixed Oxide," Journal of Catalysis 171(1), pp. 160-168, Oct. 1997.*

Wu et al., "Structure and oxygen storage capacity of Pr/Nd doped CeO2—ZrO2 mixed oxides," Solid State Sciences 9(7), pp. 636-643, Jul. 2007.*

(Continued)

*Primary Examiner* — Patricia L. Hailey
(74) *Attorney, Agent, or Firm* — Osha Liang LLP

(57) ABSTRACT

The invention relates to a composition containing zirconium, cerium and yttrium oxides with a cerium oxide proportion of between 3% and 15%, and yttrium oxide proportions corresponding to the following conditions: 6% at most if the cerium oxide proportion is between 12% excluded and 15% included; 10% at most if the cerium oxide proportion is between 7% excluded and 12% included; 30% at most if the cerium oxide proportion is between 3% and 7% included; the balance consisting of zirconium oxide. The composition may optionally include an oxide of a rare earth selected from lanthanum, neodymium and praseodymium. The composition can be used for processing the exhaust gases of a vehicle.

24 Claims, No Drawings

(56) References Cited

OTHER PUBLICATIONS

Kulyova et al., Redox Behavior of Y0.05Ce0.1Zr0.85O2 and Y0.1Ce0.1Zr0.8O2 System Catalysts Doped with Copper(II), Chemistry of Materials 13(5), pp. 1491-1496, Apr. 2001.*

Markaryan et al., "Red—ox properties and phase composition of $CeO_2$—$ZrO_2$ and $Y_2O_3$—$CeO_2$—$ZrO_2$ solid solutions", Colloids and Surfaces A: Physicochemical and Engineering Aspects 151(3), pp. 435-447, Jul. 1999.*

Menezes et al., "The role of light rare earth on thermal degradation behaviour of $ZrO_2$—$CeO_2$—$Y_2O_3$ ceramics," Materials Science Forum 416-418, pp. 573-578, Feb. 2003.*

Duh et al., "Fabrication and sinterability in Y2Oa—CeO2—Zr02," Journal of Materials Science 24(12), pp. 4467-4474, Dec. 1989.*

Ru-ming Feng et al., "Hydrothermal Synthesis of stable mesoporous $ZrO_2$—$Y_2O_3$ and $CeO_2$—$ZrO_2$—$Y_2O_3$ from simple inorganic salts and CTAB template in aqueous medium." Materials Chemistry and Physics 107, pp. 132-136. (Year: 2008).*

\* cited by examiner

COMPOSITION CONTAINING ZIRCONIUM, CERIUM AND YTTRIUM OXIDES HAVING A HIGH REDUCIBILITY, METHOD FOR PREPARING SAME AND USE THEREOF IN CATALYSIS

This application a continuation of U.S. application Ser. No. 12/989,185, filed Oct. 22, 2010, which is a U.S. national stage entry under 35 U.S.C. § 371 of International Application No. PCT/EP2009/054715, filed Apr. 21, 2009, which in turn claims priority to French Application No. FR 0802272, filed Apr. 23, 2008. The entire contents of these applications are explicitly incorporated herein by this reference.

The present invention relates to a composition based on oxides of zirconium, of cerium, of yttrium and optionally of another rare earth metal, to its processes of preparation and to its use in catalysis, in particular in the treatment of motor vehicle exhaust gases.

"Multifunctional" catalysts are currently used for the treatment of exhaust gases from internal combustion engines (automobile afterburning catalysis). The term "multifunctional" is understood to mean catalysts capable of carrying out not only oxidation, in particular of carbon monoxide and hydrocarbons present in exhaust gases, but also reduction, in particular of nitrogen oxides also present in these gases ("three-way" catalysts). Zirconium oxide and cerium oxide today appear as two particularly important and advantageous constituents for catalysts of this type. More specifically, a quality required for these oxides or constituents is their reducibility. The term "reducibility" is understood to mean, here and for the remainder of the description, the level of cerium(IV) in these constituents which is capable of being converted to cerium(III) under the effect of a reducing atmosphere and at a given temperature. This reducibility can be measured, for example, by a consumption of hydrogen within a given temperature range. It is due to the cerium, which has the property of being reduced or of being oxidized. This reducibility must, of course, be as high as possible.

In addition, it is important for this reducibility to be stable, that is to say for it to retain a value high enough for the product to remain effective even after exposure of the latter to high temperatures.

A need thus exists for products having such reducibility properties.

A subject matter of the invention is thus the development of a composition which can meet this need.

With this aim, the composition of the invention, according to a first embodiment, is based on oxides of zirconium, of cerium and of yttrium and it is characterized in that it exhibits the following proportions by weight:
 a proportion of cerium oxide of between 3 and 15%; proportions of yttrium oxide which meet the following conditions:
 a proportion of yttrium oxide of at most 6% approximately if the proportion of cerium oxide is between 12% exclusive and 15% inclusive;
 a proportion of yttrium oxide of at most 10% approximately if the proportion of cerium oxide is between 7% exclusive and 12% inclusive;
 a proportion of yttrium oxide of at most 30% approximately if the proportion of cerium oxide is between 3 and 7% inclusive;
the remainder as zirconium oxide.

According to another embodiment, the composition of the invention is based on oxides of zirconium, of cerium and of yttrium and it additionally comprises at least one oxide of a rare earth metal chosen from lanthanum, neodymium and praseodymium, these oxides being present in the following proportions by weight:
 a proportion of cerium oxide of between 3 and 15%;
 a proportion of oxide of said rare earth metal of at most 10% approximately if the proportion of cerium oxide is between 12% exclusive and 15% inclusive;
 a proportion of oxide of said rare earth metal of at most 18% approximately if the proportion of cerium oxide is between 7% exclusive and 12% inclusive;
 a total proportion of yttrium oxide and of oxide of said rare earth metal of at most 30% approximately if the proportion of cerium oxide is between 3 and 7% inclusive;
the proportions of yttrium oxide being as defined above for the first embodiment with the remainder as zirconium oxide.

As will be seen later, the compositions of the invention exhibit a high reducibility at 1000° C. which can in particular be at least 90%.

Other characteristics, details and advantages of the invention will become even more fully apparent on reading the description which will follow and also various concrete but nonlimiting examples intended to illustrate it.

In the continuation of the description, the term "specific surface" is understood to mean the BET specific surface determined by nitrogen adsorption in accordance with standard ASTM D 3663-78 laid down from the Brunauer-Emmett-Teller method described in the periodical "The Journal of the American Chemical Society, 60, 309 (1938)".

In addition, the calcinations, on conclusion of which the surface values are given, are calcinations under air.

The contents are given as weight of oxide, unless otherwise indicated. The cerium oxide is in the ceric oxide form and the oxides of the other rare earth metals are in the $Ln_2O_3$ form, Ln denoting the rare earth metal, with the exception of praseodymium, expressed in the form $Pr_6O_{11}$.

It is specified that, in the continuation of the description, unless otherwise specified, the values at the limits are included in the ranges of values which are given.

The compositions according to the invention are characterized first of all by the nature of their constituents.

As indicated above and according to the first embodiment, they are based on oxides of zirconium, of cerium and of yttrium alone or else they are composed essentially of these three oxides, it being understood thereby that they may optionally comprise other elements, in particular in the form of traces or impurities, but that they do not comprise other elements capable of influencing their reducibility or possibly their specific surface.

According to the second embodiment, the compositions of the invention additionally comprise at least one oxide of another rare earth metal which can be lanthanum, neodymium or praseodymium. It should be noted here that the combinations of these rare earth metals with one another of course come within the invention. Mention may more particularly be made of the combinations of lanthanum and neodymium. The description which follows will be carried out for convenience with reference to one rare earth metal but this description should be understood as also applying to the combinations of the abovementioned rare earth metals.

The compositions of the invention are also characterized by their contents of these various oxides. More specifically, they are characterized by a content of cerium oxide which is fairly low, since it is between 3 and 15%. A content of cerium oxide higher than 15% can result in a reduction in the reducibility and a lower content can be harmful to the catalytic properties of the compositions.

The content of yttrium oxide depends on the content of cerium oxide. Overall, this content of yttrium oxide decreases as that of cerium oxide increases. This also applies to the total content of oxides of yttrium and of rare earth metal for the compositions according to the second embodiment. The maximum contents of yttrium oxide or of oxides of yttrium and of the other rare earth metal have been given above and, if they are exceeded, this can here again result in a decrease in the reducibility of the compositions.

The minimum content of yttrium oxide is generally at least 3%, more particularly at least 5%.

The minimum content of other rare earth metal is generally at least 1%, preferably at least 2% in the case of neodymium and praseodymium.

The compositions of the invention advantageously exhibit a high degree of reducibility.

This degree of reducibility can be at least 90%. It can more particularly be at least 94%. Degrees of 100% can be achieved. The degree of reducibility given here is measured on a composition which has been subjected to calcination at 1000° C. under air for 4 hours under stationary conditions.

The reducibility of the compositions is determined by the measurement of their hydrogen consumption, measured between 1000° C. and 800° C. This measurement is carried out by temperature-programmed reduction using hydrogen diluted in argon and under conditions which will be specified later. The degree of reducibility represents the percentage of reduced cerium, it being understood that ½ mol of $H_2$ consumed and measured by this method corresponds to 1 mol of reduced Ce(IV).

The properties of reducibility of the compositions of the invention are also advantageous in that these compositions exhibit a maximum reducibility temperature which can be fairly low, in particular of at most 550° C., more particularly of at most 530° C. This temperature is given here for compositions which have also been calcined at 1000° C. for 4 hours. This maximum temperature corresponds to the temperature at which the absorption of the hydrogen is at a maximum and where, in other words, the reduction of the cerium(IV) to give cerium(III) is also at a maximum. It reflects in fact the temperature at which the reducibility and consequently the effectiveness of the composition are at a maximum. In the case of the invention, the compositions are thus effective within ranges of temperatures which are generally lower than those of the known products, for which this maximum temperature is often greater than 550° C.

The maximum reducibility temperature is consequently determined by the measurement of the ability to absorb hydrogen as a function of the temperature. This temperature corresponds to the temperature at which the absorption of the hydrogen is at a maximum and where, in other words, the reduction of the cerium(IV) to give cerium(III) is also at a maximum.

The compositions of the invention furthermore exhibit high specific surfaces, even after calcination at high temperature.

Thus, in the case of the first embodiment, they can exhibit a specific surface after calcination at 1000° C. for 4 hours of at least 30 $m^2/g$, preferably of at least $m^2/g$ and more preferably still of at least 40 $m^2/g$. Surface values ranging up to approximately 50 $m^2/g$ can be achieved.

In the case of the second embodiment, compositions additionally comprising an oxide of another rare earth metal, they can exhibit a specific surface, after calcination at 1000° C. for 4 hours, of at least 40 $m^2/g$, preferably of at least 45 $m^2/g$ and more preferably still of at least 50 $m^2/g$. Surface values ranging up to approximately 60 $m^2/g$ can be achieved.

The compositions of the first embodiment of the invention can also exhibit a specific surface, after calcination at 1100° C. for 4 hours, of at least 10 $m^2/g$, it being possible for this surface to be even of at least 15 $m^2/g$, more particularly of at least 20 $m^2/g$. Under the same calcination conditions, the compositions of the second embodiment of the invention can, for their part, exhibit a surface of at least 20 $m^2/g$, in particular of at least 25 $m^2/g$, more particularly of at least 30 $m^2/g$.

After calcination at 1200° C. for 10 hours, the specific surfaces of the compositions of the invention can be at least 2 $m^2/g$, more particularly at least 4 $m^2/g$, more particularly still at least 5 $m^2/g$.

The compositions of the invention can exhibit specific crystallographic properties.

Thus, according to a specific embodiment, the compositions of the invention exhibit a predominant phase of cubic or quadratic symmetry. In this case, it may be noted that a peak characteristic of isolated rare earth metal oxide is not observed, which affects the incorporation of the rare earth metal elements other than cerium in the crystalline matrix of the mixed oxide.

According to another specific embodiment, the compositions of the invention can be provided in the form of pure solid solutions of the cerium, yttrium and rare earth metal elements in the zirconium oxide.

In this case, the X-ray diffraction diagrams of these compositions reveal the existence of a single phase corresponding to that of a zirconium oxide crystallized in the cubic or quadratic system, thus reflecting the incorporation of the cerium, yttrium and rare earth metal elements in the crystal lattice of the zirconium oxide and thus the achievement of a true solid solution. High contents of yttrium generally favor the appearance of the cubic phase. This solid solution embodiment applies to compositions which have undergone calcination at a temperature as high as 1100° C. and for 4 hours. This means that, after calcination under these conditions, phase separation, that is to say the appearance of other phases, is not observed.

Finally, according to another specific embodiment, the compositions of the invention can be in the form of particles which exhibit a concentration gradient for the yttrium and optionally for the rare earth metal, for the compositions comprising one of them. In this case, the particles exhibit regions enriched in yttrium and optionally in other rare earth metal.

Processes for the preparation of the compositions of the invention will now be described.

According to a first embodiment, the process according to the invention comprises the following stages:
 (a) a basic compound and compounds of zirconium, of cerium, of yttrium and optionally of the other rare earth metal are brought together in liquid medium, whereby a precipitate is obtained;
 (b) said precipitate is heated in a liquid medium;
 (c) an additive, chosen from anionic surfactants, nonionic surfactants, polyethylene glycols, carboxylic acids and their salts, and surfactants of the carboxymethylated ethoxylates of fatty alcohols type, is added to the precipitate obtained in the preceding stage;
 (d) the precipitate thus obtained is calcined.

Stage (a) is carried out in a liquid medium, which is preferably water.

The compounds of zirconium, of cerium, of yttrium and optionally of the other rare earth metal, in the case of the preparation of a composition comprising such a rare earth metal compound, are preferably soluble compounds. They can in particular be salts of these elements. These compounds can be chosen from nitrates, sulfates, acetates, chlorides or ceric ammonium nitrate.

Mention may thus be made, as examples, of zirconium sulfate, zirconyl nitrate or zirconyl chloride. Use is most generally made of zirconyl nitrate. Mention may also be made in particular of cerium(IV) salts, such as nitrates or ceric ammonium nitrates, for example, which are particularly well suited here. Ceric nitrate is preferably used. It is advantageous to use salts with a purity of at least 99.5% and more particularly of at least 99.9%. An aqueous ceric nitrate solution can, for example, be obtained by reaction of nitric acid with a ceric oxide hydrate prepared conventionally by reaction of a solution of a cerous salt, for example cerous nitrate, and of an aqueous ammonia solution in the presence of aqueous hydrogen peroxide solution.

Finally, it should be noted that, in the case of the use of a compound in which this element is cerium in the III form, it is preferable to involve an oxidizing agent, for example aqueous hydrogen peroxide solution, in the course of the process. This oxidizing agent can be used by being added to the reaction medium during stage (a), in particular at the end of the latter.

It is also possible to use a sol as starting zirconium or cerium compound. The term "sol" denotes any system composed of fine solid particles of colloidal dimensions, that is to say dimensions of between approximately 1 nm and approximately 500 nm, based on a zirconium or cerium compound, this compound generally being a zirconium or cerium oxide and/or oxide hydrate, in suspension in an aqueous liquid phase, it being possible in addition for said particles optionally to comprise residual amounts of bonded or adsorbed ions, such as, for example, nitrates, acetates, chlorides or ammoniums. It should be noted that, in such a sol, the zirconium or the cerium may be found either entirely in the form of colloids or simultaneously in the form of ions and in the form of colloids.

Use may be made, as basic compound, of products of hydroxide type. Mention may be made of alkali metal or alkaline earth metal hydroxides. Use may also be made of secondary, tertiary or quaternary amines. However, amines and aqueous ammonia may be preferred insofar as they reduce the risks of pollution by alkali metal or alkaline earth metal cations. Mention may also be made of urea. The basic compound can more-particularly be used in the form of a solution.

The compounds of the abovementioned elements and basic compounds are employed in the amounts sufficient to produce the composition which it is desired to prepare.

Stage (a) can be carried out starting from compounds initially in a solid state which will subsequently be introduced into an aqueous vessel heel, for example, or alternatively directly from solutions of these compounds and then mixing said solutions in any order.

The contacting operation between the compounds of zirconium, of cerium, of yttrium and of the other rare earth metal and the basic compound can be carried in any way, for example by the addition of a preformed mixture of the compounds of the abovementioned elements to the basic compound in the form of a solution. This alternative form is preferable in order to obtain the compositions of the invention in the form of a pure cubic phase. This contacting operation is preferably carried out with stirring. It is preferably carried out at ambient temperature.

According to another alternative form, stage (a) is carried out in two steps. This is understood to mean that the compound of yttrium and/or, if appropriate, that of the other rare earth metal can be employed in the preparation process and can participate in the reaction in a second step with respect to the compounds of zirconium and of cerium. This alternative form makes it possible to obtain more particularly compositions according to the specific embodiment described above, that is to say those which exhibit a concentration gradient for the yttrium and optionally for the rare earth metal.

Thus, in a first step, the compounds of zirconium and of cerium and a portion of the basic compound or all of the latter are brought together. In the case of the preparation of a composition based on oxides of zirconium, of cerium, of yttrium and of the other rare earth metal, it is also possible to employ here a compound of yttrium or a compound of the rare earth metal.

In a second step, the other portion of said basic compound, if the latter was not completely used above, and the compound of yttrium are brought together with the medium obtained on conclusion of the first step. In the case of the preparation of a composition based on oxides of zirconium, of cerium, of yttrium and of the other rare earth metal, use is made, in the second step, of the compounds of yttrium and of the other rare earth metal, if neither of them was used in the first step of stage (a), or that of these two compounds which was not employed above during the first step of stage (a).

On conclusion of stage (a), a precipitate in suspension in the reaction medium is obtained.

The following stage (b) of the process is the stage of heating this precipitate in this medium.

This heating can be carried out directly on the reaction medium obtained after reaction with the basic compound or on a suspension obtained after separation of the precipitate from the reaction medium, optional washing and resuspending in water of the precipitate. The temperature at which the medium is heated is at least 100° C. and more particularly still at least 130° C. It can, for example, be between 100° C. and 160° C. The heating operation can be carried out by introducing the liquid medium into an enclosed space (closed reactor of the autoclave type). Under the temperature conditions given above, and in an aqueous medium, it may thus be specified, by way of illustration, that the pressure in the closed reactor can vary between a value of greater than 1 bar ($10^5$ Pa) and 165 bar ($1.65\times10^7$ Pa), preferably between 5 bar ($5\times10^5$ Pa) and 165 bar ($1.65\times10^7$ Pa). The heating can also be carried out in an open reactor for temperatures in the region of 100° C.

The heating can be carried out either under air or under an inert gas atmosphere, preferably nitrogen.

The duration of the heating can vary within wide limits, for example between 1 and 48 hours, preferably between 2 and 24 hours. The rise in temperature likewise takes place at a rate which is not critical and it is thus possible to achieve the set reaction temperature by heating the medium, for example, for between 30 minutes and 4 hours, these values being given entirely by way of indication. It is possible to carry out several heating operations.

Thus, the precipitate obtained after the heating stage and optionally a washing operation can be resuspended in water and then another heating operation can be carried out on the medium thus obtained. This other heating operation is carried out under the same conditions as those which have been described for the first.

The following stage (c) of the process consists in adding, to the precipitate resulting from the preceding stage, an additive which is chosen from anionic surfactants, nonionic surfactants, polyethylene glycols and carboxylic acids and their salts, and also surfactants of the carboxymethylated ethoxylates of fatty alcohols type.

As regards this additive, reference may be made to the teaching of application WO 98/45212 and use may be made of the surfactants described in this document.

Mention may be made, as surfactants of the anionic type, of ethoxycarboxylates, ethoxylated fatty acids, sarcosinates, phosphate esters, sulfates, such as alcohol sulfates, alcohol ether sulfates and sulfated alkanolamide ethoxylates, sulfonates, such as sulfo-succinates, alkylbenzenesulfonates or alkylnaphthalene-sulfonates.

Mention may be made, as nonionic surfactants, of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may in particular be made of the products sold under the brand names Igepal®, Dowanol®, Rhodamox® and Alkamide®.

As regards the carboxylic acids, use may in particular be made of aliphatic mono- or dicarboxylic acids and, among these, more particularly of saturated acids. Use may also be made of fatty acids and more particularly of saturated fatty acids. Mention may thus in particular be made of formic, acetic, propionic, butyric, isobutyric, valeric, caproic, caprylic, capric, lauric, myristic and palmitic acids. Mention may be made, as dicarboxylic acids, of oxalic, malonic, succinic, glutaric, adipic, pimelic, suberic, azelaic and sebacic acids.

The salts of the carboxylic acids can also be used, in particular the ammoniacal salts.

Mention may more particularly be made, by way of example, of lauric acid and ammonium laurate.

Finally, it is possible to use a surfactant which is chosen from those of the carboxymethylated ethoxylates of fatty alcohols type.

The term "product of the carboxymethylated ethoxylates of fatty alcohols type" is understood to mean products composed of ethoxylated or propoxylated fatty alcohols comprising a $CH_2$—COOH group at the chain end.

These products can correspond to the formula:

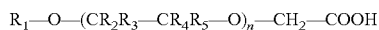

$$R_1-O-(CR_2R_3-CR_4R_5-O)_n-CH_2-COOH$$

in which $R_1$ denotes a saturated or unsaturated carbon chain, the length of which is generally at most 22 carbon atoms, preferably at least 12 carbon atoms; $R_2$, $R_3$, $R_4$ and $R_5$ can be identical and represent hydrogen or alternatively $R_2$ can represent a $CH_3$ group and $R_3$, $R_4$ and $R_5$ represent hydrogen; n is a nonzero integer which can range up to 50 and more particularly of between 5 and 15, these values being inclusive. It should be noted that a surfactant can be composed of a mixture of products of the above formula for which $R_1$ can be saturated or unsaturated respectively or alternatively products comprising both —$CH_2$—$CH_2$—O— and —$CH(CH_3)$—$CH_2$—O— groups.

The surfactant can be added in two ways. It can be added directly to the precipitate suspension resulting from the preceding heating stage (b). It can also be added to the solid precipitate after separation of the latter by any known means from the medium in which the heating took place.

The amount of surfactant used, expressed as percentage by weight of additive with respect to the weight of the composition, calculated as oxide, is generally between and 100%, more particularly between 15 and 60%.

According to another advantageous alternative form of the invention, before carrying out the final stage of the process (calcination stage), the precipitate is washed after having separated it from the medium in which it occurred in suspension. This washing operation can be carried out with water, preferably with water at basic pH, for example aqueous ammonia solution.

In a final stage of the process according to the invention, the precipitate recovered is subsequently calcined. This calcination makes it possible to develop the crystallinity of the product formed and it can also be adjusted and/or chosen according to the subsequent operating temperature intended for the composition according to the invention, this being done while taking into account the fact that the specific surface of the product decreases as the calcination temperature employed increases. Such a calcination is generally carried out under air but a calcination carried out, for example, under an inert gas or under a controlled atmosphere (oxidizing or reducing) is very clearly not excluded.

In practice, the calcination temperature is generally restricted to a range of values of between 500 and 1000° C.

The process for the preparation of the compositions according to a second embodiment of the invention will now be described.

This process comprises the following stages:
(a') at least a portion of the basic compound and of the compounds of zirconium and of cerium and
a portion of the yttrium compound, in the case of the preparation of a composition based only on oxides of zirconium, of cerium and of yttrium,
a portion of at least one of the compounds of yttrium and of the rare earth metal, in the case of the preparation of a composition based on oxides of zirconium, of cerium, of yttrium and of the rare earth metal,
are brought together in a liquid medium, whereby a precipitate is obtained;
(b') said precipitate is heated in a liquid medium;
(c') on conclusion of stage (b), the remaining portion of the basic compound, if appropriate, and the remaining portion of the yttrium compound or of at least one of the compounds of yttrium and of the rare earth metal are added to the liquid medium;
(d') an additive, chosen from anionic surfactants, nonionic surfactants, polyethylene glycols, carboxylic acids and their salts, and surfactants of the carboxymethylated ethoxylates of fatty alcohols type, is added to the precipitate obtained in the preceding stage;
(e') the precipitate thus obtained is calcined.

The process of this second form also makes it possible to more particularly obtain compositions according to the specific embodiment described above, that is to say those which exhibit a concentration gradient for the yttrium and optionally for the rare earth metal.

This process differs from the process according to the first form essentially in the way in which the yttrium and the rare earth metal are introduced. This is because use is made, in the first stage (a') of only a portion of the compounds of yttrium and/or of rare earth metal and not of the whole of these, and also the basic compound, that are to be used here either in its entirety or in part only. The remainder is then introduced on conclusion of the heating stage (b') in order to precipitate the remaining portion of the compounds of yttrium and and/or of rare earth metal. The remaining amount of the basic compound, if the latter was not employed in its entirety in stage (a'), is also introduced at this point. The order of introduction of the compounds can be fully adjusted according to the composition which it is desired to prepare and the characteristics desired; for example, it is possible to introduce all the yttrium compound and only a portion of that of the rare earth metal in stage (a') or vice-versa or also to introduce only a portion of the two compounds and the remainder in stage (c').

Apart from this difference, it is thus understood that that which was said in the description of the process according to the first embodiment, in particular for the stages of precipitation (a), of heating (b), of addition of the additive (c) and of calcination (d), likewise applies here, especially for the corresponding stages (a'), (b'), (d') and (e').

It should be noted that the invention also covers a composition based on oxides of zirconium, of cerium and of yttrium and optionally of a rare earth metal chosen from lanthanum, neodymium and praseodymium which exhibits the proportions of oxides of these various elements given above and which is capable of being obtained by the process comprising the stages (a'), (b'), (c'), (d') and (e') which have been described above.

The compositions of the invention as described above or as obtained by the processes studied above are provided in the form of powders but they can optionally be shaped in order to be provided in the form of granules, balls, cylinders or honeycombs of variable sizes.

The compositions of the invention can be used as catalysts or catalyst supports. Thus, the invention also relates to catalytic systems comprising the compositions of the invention. For such systems, these compositions can thus be applied to any support commonly used in the field of catalysis, that is to say in particular thermally inert supports. This support can be chosen from alumina, titanium oxide, cerium oxide, zirconium oxide, silica, spinels, zeolites, silicates, crystalline silicoaluminum phosphates or crystalline aluminum phosphates.

The compositions can also be used in catalytic systems comprising a coating (wash coat), based on these compositions and with catalytic properties, on a substrate of the metal or ceramic monolith type, for example. The coating can itself also comprise a support of the type of those mentioned above. This coating is obtained by mixing the composition with the support, so as to form a suspension which can subsequently be deposited on the substrate.

These catalytic systems and more particularly the compositions of the invention can have a great many applications. They are therefore particularly well suited to, and thus usable in, the catalysis of various reactions, such as, for example, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion or catalytic oxidation of the soot emitted by internal combustion engines, such as diesel engines or petrol engines operating under lean burn conditions. Finally, the catalytic systems and the compositions of the invention can be used as $NO_x$ traps or to promote the reduction of the $NO_x$ compounds, even in an oxidizing medium.

In the case of these uses in catalysis, the compositions of the invention are employed in combination with precious metals; they thus act as support for these metals. The nature of these metals and the techniques for the incorporation of the latter in the support compositions are well known to a person skilled in the art. For example, the metals can be platinum, rhodium, palladium or iridium and they can, in particular, be incorporated in the compositions by impregnation.

Among the uses mentioned, the treatment of exhaust gases from internal combustion engines (automobile afterburning catalysis) is a particularly advantageous application. For this reason, the invention also relates to a process for the treatment of exhaust gases from internal combustion engines which is characterized in that use is made, as catalyst, of a catalytic system as described above or of a composition according to the invention and as described above.

Examples will now be given.

In these examples, the degree of reducibility is measured under the following conditions.

Degree of Reducibility

The degree of reducibility of the cerium is measured by carrying out a temperature-programmed reduction on a Micromeritics Autochem II device. This device makes it possible to measure the hydrogen consumption of a composition according to the invention as a function of the temperature and to deduce therefrom the degree of reduction of the cerium.

More specifically, hydrogen is used as reducing gas at 10% by volume in argon with a flow rate of 30 ml/min. The experimental protocol consists in weighing 200 mg of the sample into a pretared container. The sample is subsequently introduced into a quartz cell containing, in the bottom, quartz wool. The sample is positioned in the furnace of the measuring device. The temperature program is as follows:
  oxidation: rise in temperature up to 400° C. with a rise slope at 20° C./min under $O_2$ at 5 vol % in He;
  stationary phase of 30 min and then downward slope to 50° C.;
  stationary phase of 10 min;
  reduction: rise in temperature up to 8000° C. with a rise slope at 10° C./min under $H_2$ at 10 vol % in Ar; stationary phase of 10 min;
  flushing under Ar at 900° C. for 10 min before oxidation of the sample and returning to ambient temperature.

During this program, the temperature of the sample is measured using a thermocouple placed at the level of the sample. The hydrogen consumption during the reduction phase is deduced by virtue of the calibration of the variation in the thermal conductivity of a gas stream measured at the outlet of the cell using a thermal conductivity detector (TCD).

The degree of reduction of the cerium is calculated from the hydrogen consumption measured between 100° C. and 800° C.

EXAMPLE 1

This example relates to a composition comprising 83% of zirconium, 5% of cerium, 2% of lanthanum, 5% of yttrium and 5% of neodymium, these proportions being expressed as percentages by weight of the oxides $ZrO_2$, $CeO_2$, $La_2O_3$, $Y_2O_3$ and $Nd_2O_3$.

313 ml of zirconium nitrate (266 g/l as $ZrO_2$), 19.7 ml of cerium nitrate, 4.4 ml of lanthanum nitrate (456 g/l as $La_2O_3$), 13.1 ml of yttrium nitrate (382 g/l as $Y_2O_3$) and 9.5 ml of neodymium nitrate (524 g/l as $Nd_2O_3$) are introduced into a stirred beaker. The mixture is subsequently made up with distilled water so as to obtain 1 liter of a solution of nitrates.

203 ml of an aqueous ammonia solution (12 mol/l) are introduced into a stirred reactor and the solution is subsequently made up with distilled water so as to obtain a total volume of 1 liter.

The solution of nitrates is introduced into the reactor with continual stirring.

The solution obtained is placed in a stainless steel autoclave equipped with a stirrer. The temperature of the medium is brought to 150° C. for 2 hours with stirring.

33 grams of lauric acid are added to the suspension thus obtained. The suspension is kept stirred for 1 hour.

The suspension is then filtered through a Büchner funnel and then aqueous ammonia solution is added to the filtered precipitate in a proportion of one times the volume of the aqueous filtration mother liquors. The product obtained is subsequently brought to 700° C. for 4 hours under stationary conditions.

EXAMPLES 2 TO 12

Unless otherwise indicated below, the procedure is the same as in example 1. For example 8, the process starts with a dilute solution B containing the neodymium nitrate and with a dilute solution A containing all the other constituents. Solution B is added to the aqueous ammonia solution after solution A and then the combined mixture is heated as in example 1. For example 9, solution B contains yttrium nitrate. For example 10, solution B comprises yttrium nitrate and neodymium nitrate. For example 6, the praseodymium nitrate solution exhibits a $Pr_6O_1$ concentration of 500 g/l.

The volumes of various reactant solutions used in the preparation of the compositions of the examples will be found in table 1 below. The contents of oxides of various compositions obtained on conclusion of these preparations are given in table 2. The surface values for these same compositions are shown in table 3 and their reducibility properties after calcination at 1000° C. for 4 hours are shown in table 4.

The reducibility profiles drawn up during the measurement of the degree of reducibility according to the method given above for these oxides show low-temperature peaks, which means that these oxides exhibit a fraction of cerium reducible at low temperature. Thus, the temperature at which this first reduction occurs lies between 150 and 230° C. The area corresponding to this peak is equivalent to between 3 and 15% of the total area under the reducibility curve. This means that the fraction of cerium reducible at low temperature represents between 3 and 15% of the total cerium when the reducibility is 100%.

In order to clearly confirm that these peaks are not due to impurities present at the surface of the oxide which are reduced during the treatment carried out during the reducibility measurement, which is sometimes the case, reducibility measurements were carried out after an in situ pre-calcination under air of the sample at 800° C. This pretreatment makes it possible to remove all the impurities present at the surface of the sample. The low-temperature peaks remain after pretreatment, which means that this phenomenon indeed corresponds to a reduction of the cerium.

These results show that the compositions of the invention begin to exhibit oxidation/reduction properties from low temperatures, in particular in a temperature range lying between 150° C. and 230° C.

TABLE 1

Amounts of reactants used, expressed as volume (ml) of the solutions of the salts of the various elements

| Example | V Zr | V Ce | V La | V Y | V Nd | V Pr | V aqueous ammonia |
|---|---|---|---|---|---|---|---|
| 1 | 313 | 19.7 | 4.4 | 13.1 | 9.5 | — | 203 |
| 2 | 275 | 19.7 | 4.4 | 13.1 | 28.6 | — | 204 |
| 3 | 256 | 19.7 | 4.4 | 52.4 | 9.5 | — | 221 |
| 4 | 218 | 19.7 | 4.4 | 52.4 | 28.6 | — | 222 |
| 5 | 266 | 19.7 | 4.4 | 32.4 | 19.1 | — | 212 |
| 6 | 301 | 19.7 | — | 26.2 | — | 10.0 | 208 |
| 7 | 294 | 39.4 | 4.4 | 13.1 | 9.5 | — | 208 |
| 8 | 282 | 39.4 | 4.4 | 20.9 | 9.5 | — | 211 |
| 9 | 313 | 39.4 | — | 18.3 | — | — | 209 |
| 10 | 271 | 39.4 | — | 20.9 | 19.1 | — | 212 |
| 11 | 256 | 39.4 | 4.4 | 13.1 | 28.6 | — | 210 |
| 12 | 275 | 59.1 | 4.4 | 13.1 | 9.5 | — | 213 |

TABLE 2

Contents, expressed as oxides, of the various elements

| Example | % Zr | % Ce | % La | % Y | % Nd | % Pr |
|---|---|---|---|---|---|---|
| 1 | 83 | 5 | 2 | 5 | 5 | — |
| 2 | 73 | 5 | 2 | 5 | 15 | — |
| 3 | 68 | 5 | 2 | 20 | 5 | — |
| 4 | 58 | 5 | 2 | 20 | 15 | — |
| 5 | 70.5 | 5 | 2 | 12.5 | 10 | — |
| 6 | 80 | 5 | — | 10 | — | 5 |
| 7 | 78 | 10 | 2 | 5 | 5 | — |
| 8 | 75 | 10 | 2 | 8 | 5 | — |
| 9 | 83 | 10 | — | 7 | — | — |
| 10 | 72 | 10 | — | 8 | 10 | — |
| 11 | 68 | 10 | 2 | 5 | 15 | — |
| 12 | 73 | 15 | 2 | 5 | 5 | — |

TABLE 3

Specific surfaces in $m^2/g$

| Example | 4 h/900° C. | 4 h/1000° C. | 4 h/1100° C. |
|---|---|---|---|
| 1 | 67 | 47 | 23 |
| 2 | 80 | 51 | 22 |
| 3 | 71 | 51 | 28 |
| 4 | 70 | 50 | 26 |
| 5 | 80 | 53 | 23 |
| 6 | 60 | 45 | 20 |
| 7 | 70 | 47 | 22 |
| 8 | 64 | 47 | 27 |
| 9 | 52 | 33 | 15 |
| 10 | 64 | 49 | 27 |
| 11 | 80 | 53 | 22 |
| 12 | 71 | 48 | 21 |

TABLE 4

Reducibility properties

| Example | Maximum reducibility temperature at 1000° C. | Degree of reducibility at 1000° C. |
|---|---|---|
| 1 | 516 | 100 |
| 2 | 508 | 100 |
| 3 | 515 | 100 |
| 4 | 534 | 100 |
| 5 | 514 | 100 |
| 6 | 526 | 100 |
| 7 | 534 | 100 |
| 8 | 530 | 98 |

TABLE 4-continued

Reducibility properties

| Example | Maximum reducibility temperature at 1000° C. | Degree of reducibility at 1000° C. |
|---|---|---|
| 9 | 544 | 99 |
| 10 | 535 | 93 |
| 11 | 526 | 90 |
| 12 | 547 | 94 |

EXAMPLES 13 AND 14

Two oxides with the composition $ZrO_2/CeO_2/Y_2O_3/Nd_2O_3$ 75/10/5/10 are prepared. Example 13 is carried out according to the procedure of example 1. For example 14, the process starts with a dilute solution B containing the nitrates of neodymium and of yttrium and with a dilute solution A containing all the other constituents. Solution B is added to the aqueous ammonium solution after solution A and then the combined mixture is heated as in example 1.

A leaching test with dilute nitric acid makes it possible to compare the content of yttrium at the surface of the oxides prepared according to these two methods. This test is carried out in the following way: 1 gram of oxide is dispersed with stirring in 10 ml of a solution containing 0.1 mol/l of nitric acid. After stirring at 40° C. for 2 hours, the suspension is filtered. Analysis of the filtrate by the ICP technique makes it possible to determine the amounts of yttrium which are recovered. In order to determine the fractions of yttrium which are recovered, these values are respectively divided by the amount of yttrium present in the oxide sample. The results obtained for examples 13 and 14 are presented in the following table 5:

TABLE 5

|  | Fraction of yttrium recovered (%) |
|---|---|
| Example 14 | 5 |
| Example 15 | 19 |

In order to characterize the crystalline phases present in the samples, an X-ray diffraction analysis is carried out. The analyses are carried out on a powder using a Panalytical diffractometer equipped with a multichannel detector of X'Celerator type and with a Kβ/Kα monochromator. The data are collected in 20 minutes between 20=20 and 20=1000 with a step of 0.017 mm. All the samples exist in the form of a highly predominant phase characteristic of a solid solution of cubic or tetragonal symmetry. In particular, the presence of rare earth metal oxides by themselves is not detected, which reflects the incorporation of the rare earth metals (La, Y, Nd and/or Pr) in the Ce—Zr matrix.

What is claimed is:

1. A catalyst composition comprising oxides of zirconium, cerium and yttrium, in the following proportions by weight relative to the total weight of the composition:
   a proportion of cerium oxide of between 3 and 15%;
   a proportion of yttrium oxide which meets one of the following conditions:
      a proportion of yttrium oxide of at most 6% if the proportion of cerium oxide is between 12% exclusive and 15% inclusive;
      a proportion of yttrium oxide of at most 10% if the proportion of cerium oxide is between 7% exclusive and 12% inclusive; or
      a proportion of yttrium oxide of at most 30% if the proportion of cerium oxide is between 3 and 7% inclusive; and
   the remainder as zirconium oxide;
   wherein the composition, after calcination at 1000° C. for 4 hours, exhibits:
      a degree of reducibility of at least 90%;
      a maximum reducibility temperature of at most 550° C.; and
      a specific surface area of at least 40 m²/g.

2. The catalyst composition as claimed in claim 1, the content of yttrium is at least 3%.

3. The catalyst composition as claimed in claim 1, wherein the composition has a degree of reducibility of at least 94%, measured on the composition calcined at 1000° C. for 4 hours.

4. The catalyst composition as claimed in claim 1, wherein the composition has a maximum reducibility temperature of at most 530° C.

5. A catalytic system comprising a catalytic composition as claimed in claim 1.

6. A process for the treatment of exhaust gases from internal combustion engines, the process comprising contacting the exhaust gas with a catalyst composition as claimed in claim 1.

7. The catalyst composition according to claim 1, wherein the composition has a specific surface area of at least 10 m²/g after calcination at 1100° C. for 4 hours.

8. The catalyst composition according to claim 1, wherein the composition has a specific surface area of at least 15 m²/g after calcination at 1100° C. for 4 hours.

9. The catalyst composition according to claim 1, wherein the composition has a specific surface area of at least 20 m²/g after calcination at 1100° C. for 4 hours.

10. The catalyst composition according to claim 1, wherein the composition has a specific surface area of at least 2 m²/g after calcination at 1200° C. for 4 hours.

11. A catalyst composition comprising oxides of zirconium, cerium, yttrium and at least one oxide of a rare earth metal selected from lanthanum, neodymium and praseodymium, in the following proportions by weight relative to the total weight of the composition:
   a proportion of cerium oxide of between 3 and 15%;
   a proportion of yttrium oxide which meets one of the following conditions:
      a proportion of yttrium oxide of at most 6% if the proportion of cerium oxide is between 12% exclusive and 15% inclusive;
      a proportion of yttrium oxide of at most 10% if the proportion of cerium oxide is between 7% exclusive and 12% inclusive; or
      a proportion of yttrium oxide of at most 30% if the proportion of cerium oxide is between 3 and 7% inclusive;
   a proportion of the at least one oxide of a rare earth metal that meets one of the following conditions:
      a proportion of oxide of said rare earth metal of at most 10% if the proportion of cerium oxide is between 12% exclusive and 15% inclusive;
      a proportion of oxide of said rare earth metal of at most 18% if the proportion of cerium oxide is between 7% exclusive and 12% inclusive; or a total proportion of yttrium oxide and of oxide of said rare earth metal of at most 30% if the proportion of cerium oxide is between 3 and 7% inclusive; and the remainder as zirconium oxide;

wherein the composition, after calcination at 1000° C. for 4 hours, exhibits:

a degree of reducibility of at least 90%;

a maximum reducibility temperature of at most 550° C.; and a specific surface area of at least 40 m$^2$/g.

12. The catalyst composition as claimed in claim 11, wherein the composition is in the form of particles which exhibit a concentration gradient for the yttrium and for the rare earth metal.

13. A process for the preparation of the catalyst composition of claim 11, the process comprising:
   (a') contacting at least a portion of a basic compound and compounds of zirconium and cerium with
   a portion of at least one of a compound of yttrium or compounds of the at least one rare earth metal selected from lanthanum, neodymium and praseodymium,
   in a liquid medium to form a precipitate;
   (b') heating the precipitate in the liquid medium;
   (c') adding, after stage (b), remaining basic compound, if any, and remaining compounds of yttrium and of the rare earth metal to the liquid medium;
   (d') adding an additive selected from anionic surfactants, nonionic surfactants, polyethylene glycols, carboxylic acids and their salts, and surfactants of the carboxymethylated ethoxylates of fatty alcohols type, to the precipitate obtained in stage (c');
   (e') calcining the precipitate obtained in stage (d').

14. The catalyst composition according to claim 11, wherein the composition has a specific surface area of at least 45 m$^2$/g after calcination at 1000° C. for 4 hours.

15. The catalyst composition according to claim 11, wherein the composition has a specific surface area of at least 50 m$^2$/g after calcination at 1000° C. for 4 hours.

16. The catalyst composition according to claim 11, wherein the composition has a specific surface area of at least 20 m$^2$/g after calcination at 1100° C. for 4 hours.

17. The catalyst composition according to claim 11, wherein the composition has a specific surface area of at least 25 m$^2$/g after calcination at 1100° C. for 4 hours.

18. The catalyst composition according to claim 11, wherein the composition has a specific surface area of at least 30 m$^2$/g after calcination at 1100° C. for 4 hours.

19. The catalyst composition according to claim 11, wherein the composition has a specific surface area of at least 2 m$^2$/g after calcination at 1200° C. for 4 hours.

20. A process for the preparation of a catalyst composition, the process comprising:
   (a) contacting a basic compound with compounds of zirconium, cerium, and yttrium, in a liquid medium to form a precipitate;
   (b) heating the precipitate in the liquid medium;
   (c) adding an additive selected from anionic surfactants, nonionic surfactants, polyethylene glycols, carboxylic acids and their salts, and surfactants of the carboxymethylated ethoxylates of fatty alcohols type, to the precipitate-obtained in stage (b);
   (d) calcining the precipitate obtained in stage (c),
   wherein the catalyst composition comprises oxides of zirconium, cerium and yttrium, in the following proportions by weight relative to the total weight of the composition:
   a proportion of cerium oxide of between 3 and 15%;
   a proportion of yttrium oxide which meets one of the following conditions:
   a proportion of yttrium oxide of at most 6% if the proportion of cerium oxide is between 12% exclusive and 15% inclusive;
   a proportion of yttrium oxide of at most 10% if the proportion of cerium oxide is between 7% exclusive and 12% inclusive; or
   a proportion of yttrium oxide of at most 30% if the proportion of cerium oxide is between 3 and 7% inclusive; and
   the remainder as zirconium oxide, and
   wherein the composition, after calcination at 1000° C. for 4 hours, exhibits:
   a degree of reducibility of at least 90%;
   a maximum reducibility temperature of at most 550° C.; and
   a specific surface area of at least 40 m$^2$/g.

21. The process as claimed in claim 20, wherein stage (a) comprises:
   contacting the compounds of zirconium and of cerium with a portion or all of the basic compound and, the compounds of yttrium or of the rare earth metal, and
   adding remaining basic compound, if any, and
   any remaining compound of yttrium.

22. The process as claimed in claim 20, wherein the compounds of zirconium, cerium, and yttrium and comprise the nitrates, sulfates, acetates and/or chlorides thereof.

23. The process as claimed in claim 20, wherein heating the precipitate is carried out at a temperature of at least 100° C.

24. The process as claimed in claim 20, wherein the precipitate is washed before the calcination.

* * * * *